United States Patent
Jiang et al.

(10) Patent No.: US 9,862,384 B2
(45) Date of Patent: Jan. 9, 2018

(54) METHOD OF SHIFTING A TRANSMISSION

(71) Applicant: Ford Global Technologies, LLC, Dearborn, MI (US)

(72) Inventors: Hong Jiang, Birmingham, MI (US); Zhengyu Dai, Canton, MI (US); Yang Xu, Dearborn, MI (US); Guopeng Hu, Northville, MI (US); Weitian Chen, Windsor (CA); Timothy L. Sargent, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 207 days.

(21) Appl. No.: 15/018,034

(22) Filed: Feb. 8, 2016

(65) Prior Publication Data
US 2017/0225683 A1  Aug. 10, 2017

(51) Int. Cl.
*B60W 10/101* (2012.01)
*B60W 30/18* (2012.01)
*B60W 10/06* (2006.01)
*F16H 61/66* (2006.01)

(52) U.S. Cl.
CPC ............ *B60W 30/18* (2013.01); *B60W 10/06* (2013.01); *B60W 10/101* (2013.01); *B60W 2510/1005* (2013.01); *B60W 2520/10* (2013.01); *B60W 2540/10* (2013.01); *B60W 2540/16* (2013.01); *B60W 2710/0666* (2013.01); *B60W 2710/1005* (2013.01); *F16H 2061/6611* (2013.01)

(58) Field of Classification Search
None
See application file for complete search history.

(56) References Cited

U.S. PATENT DOCUMENTS

| 7,548,810 | B2 | 6/2009 | Aoki | |
|---|---|---|---|---|
| 9,150,213 | B2 | 10/2015 | Ishikawa et al. | |
| 2004/0009843 | A1* | 1/2004 | Habeck | F16H 61/061 477/143 |
| 2014/0000971 | A1* | 1/2014 | Wang | B60W 20/00 180/65.265 |
| 2014/0004994 | A1* | 1/2014 | Wang | B60K 6/445 477/4 |
| 2014/0005865 | A1* | 1/2014 | Wang | B60W 10/04 701/22 |
| 2015/0166048 | A1 | 6/2015 | Herrmann et al. | |

FOREIGN PATENT DOCUMENTS

| JP | S649040 A | 1/1989 |
|---|---|---|
| JP | 2004176641 A | 6/2004 |
| JP | 2004183489 A | 7/2004 |
| WO | 2015019946 A1 | 2/2015 |

* cited by examiner

*Primary Examiner* — Justin Holmes
(74) *Attorney, Agent, or Firm* — James Dottavio; Brooks Kushman P.C.

(57) ABSTRACT

A method of controlling a Continuously Variable Transmission (CVT) simulates a step-ratio transmission upshift. To simulate a step-ratio torque phase, the input torque is gradually reduced before beginning to change the variator ratio. Then, as the variator ratio is changed, the input torque is gradually increased to compensate for the decreasing torque ratio, simulating the relatively constant output torque of an inertia phase of a step-ratio upshift.

17 Claims, 5 Drawing Sheets

METHOD OF SHIFTING A TRANSMISSION

TECHNICAL FIELD

This disclosure relates to the field of automotive transmissions controls. More particularly, the disclosure pertains to a method of controlling a continuously variable transmission to simulate a step-ratio transmission.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

Various ways of known of varying the speed ratio of a transmission. Some transmissions have a collection of gearing and shift elements configured such that engaging various subsets of the shift elements establish various power flow paths between an input shaft and an output shaft. These various power flow paths operate at different speed ratios between the input shaft and the output shaft. To change from one speed ratio to another speed ratio, one of more shift elements are disengaged and one or more shift elements are engaged in order to change which power flow path is utilized. Other transmissions utilize a variator to change speed ratio. A variator is capable of efficiently transmitting power at any speed ratio between an upper and lower limit and changing the speed ratio gradually while transmitting power. The upper and lower speed ratio limits of the variator may not match the speed ratio requirements of the vehicle. In that case, a transmission with a variator may also include gearing and shift elements such that the range of available speed ratios between the input shaft and the output shaft match vehicle requirements. The mechanism used to adjust the speed ratio influences the sensations experienced by vehicle occupants, including engine noise and vehicle acceleration.

SUMMARY

A method simulates a step-ratio upshift in a vehicle with a continuously variable transmission. After scheduling the upshift and prior to adjusting the variator ratio, the input torque is decreased to simulate a step-shift torque phase. During the variator ratio adjustment, the input torque is increased to compensate for decreasing torque multiplication to simulate a step-shift inertia phase. After the simulated inertia phase, the input torque may be increased relative to a pre-shift level to reduce output torque variation. The upshift may be scheduled in response to a vehicle speed increase, a pedal position decrease, or driver manipulation of an upshift control.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
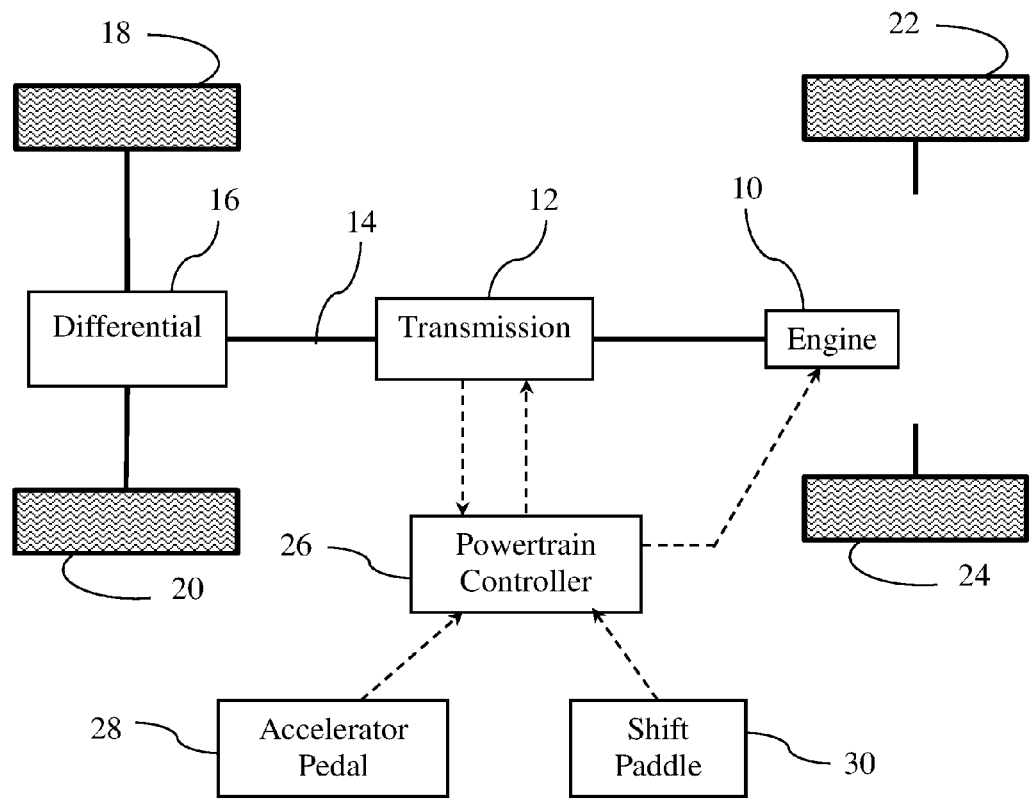
FIG. 1 is a schematic diagram of an exemplary vehicle powertrain.

FIG. 1 illustrates a rear wheel drive vehicle powertrain. The flow of mechanical power is indicated by solid lines while dotted lines indicate the flow of information. Power is generated by internal combustion engine 10. Transmission 12 conditions this power for vehicle use and delivers it to driveshaft 14. Specifically, transmission 12 permits the engine crankshaft to rotate at a suitable speed for efficient engine operation while driveshaft 14 rotates at a speed proportional to vehicle speed. When the crankshaft rotates faster than the driveshaft, the transmission applies a multiple of the crankshaft torque to the driveshaft. Differential 16 divides the power between left and right drive wheels 18 and 20 while allowing slight speed differences between the wheels as the vehicle turns a corner. Differential 16 also changes the axis of rotation by 90 degrees and multiplies the torque by a fixed final drive ratio. Left and right front wheels 22 and 24 are not powered. In some vehicles, a transfer case may be mounted between the transmission and driveshaft which diverts some of the power to the front wheels. A front wheel drive powertrain operates similarly except that the engine and transmission are typically mounted transversely. In a front wheel drive powertrain, the differential may be linked to the transmission by gearing or a chain. The transmission and differential may be combined into a common housing and called a transaxle.

Engine 10 and transmission 12 are controlled by signals from powertrain controller 26. For example, controller 26 may send signals to engine 10 to adjust the torque output by varying the throttle opening, ignition timing, fuel injection, etc. Controller 26 may effect a change in transmission ratio by sending electrical signals to a valve body of transmission 12 causing the pressures in particular hydraulic circuits to change. Controller 26 determines the desired engine torque and desired transmission ratio based on various input signals. These input signals may include signals from transmission sensors indicating the speeds of various elements or the torque transmitted by various elements. The input signals also include a signal indicating the position of a driver operated accelerator pedal 28.

Controller 26 schedules transmission shifts and also controls the engine and transmission during a shift event to effectuate the shift. Some shifts are scheduled automatically. For example, an upshift may be scheduled in response to an increase in vehicle speed, a decrease in driver demanded torque as indicated by accelerator pedal position, or some combination of the two. Similarly, a downshift may be scheduled in response to the vehicle slowing down, the driver depressing the accelerator pedal, or some combination of the two. Some vehicles may be equipped with shift paddles 30 or other driver interface features permitting the driver to override or influence the transmission ratio determination. For example, a driver may activate an upshift paddle to indicate a preference for a higher gear number (lower transmission ratio) than what is selected by the ratio scheduling algorithm. The controller may schedule an upshift in response to activation of the paddle even in the absence of a speed change or accelerator pedal position change.

Various mechanisms are known for varying the ratio of crankshaft speed to driveshaft speed, called the transmission ratio. In a step-ratio transmission, a collection of gearing a shift elements are arranged such that engaging various subsets of the shift elements establish various power flow paths. Different power flow paths have different speed ratios. To change from one speed ratio to another speed ratio, one or more shift elements is released and one or more other shift elements are engaged. A shift element that selectively couples two rotatable elements to one another is called a clutch. A shift element that selectively couples a rotatable element to a fixed element to selectively hold it against rotation is called a brake. Some shift elements couple elements via friction between plates. The torque capacity of such as shift element, the maximum amount of torque that can be transferred from one element to the other, is varied by controlling the normal force with which the plates are pressed together. Other shift elements may be passive devices such as one-way-clutches that transmit torque in one direction but over-run in the opposite direction. Other shift elements may be positive engagement devices such as dog clutches.

Figure 2:
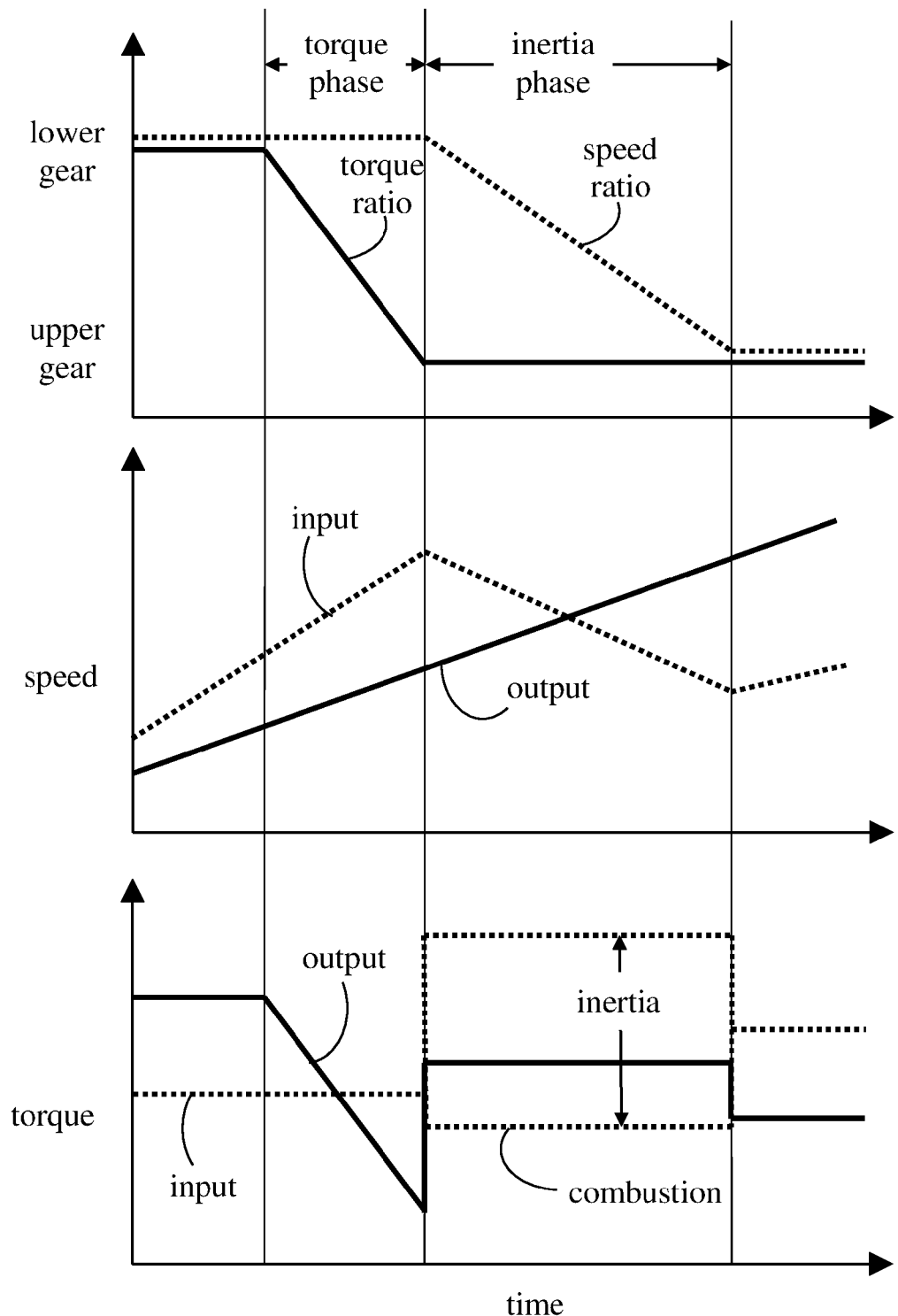
FIG. 2 is set of graphs describing an upshift in a step-ratio automatic transmission.

FIG. 2 illustrates an upshift with a step-ratio transmission. An upshift changes the transmission ratio, the ratio of transmission input speed to transmission output speed, to a lower value. (Gear numbers like 1st, 2nd, etc. increase as the corresponding transmission ratio decreases.) The middle graph shows the transmission input and output speeds. The output speed is shown gradually increasing in proportion to vehicle speed indicating that the vehicle is accelerating. For simplicity, this document discusses only shifts with a single off-going shift element and a single on-coming shift element. At the beginning of the shift event, the off-going shift element is transmitting torque and speed difference between the two elements, called the slip, is small or zero. The on-coming shift element is transmitting negligible torque and the slip is relatively large.

With a step-ratio transmission, an upshift proceeds in two stages: a torque phase and an inertia phase. During the torque phase, the power flow is switched from the original power path to the new power flow path. This is accomplished by gradually reducing the torque capacity of the off-going shift element and gradually increasing the torque capacity of the on-coming shift element. During the torque phase, some of the power flows through the original power flow path and the remainder flows through the upshifted power flow path. The resulting torque ratio is a weighted average of the ratios associated with the two power flow paths. Therefore, the torque ratio gradually changes from the original ratio to the upshifted ratio as the torque phase progresses. The speed ratio is maintained equal to or slightly higher than the original ratio throughout the torque phase. The off-going shift element would be incapable of transmitting torque in the correct direction if the speed ratio became less than the original gear ratio.

Once the off-going shift element is completely released, the inertia phase begins. During this phase, the speed ratio gradually changes to the upshifted ratio, gradually reducing the slip of the on-coming shift element. The torque ratio is constant at the upshifted ratio. During this phase, the input torque is the sum of two components, the torque generated by combustion and the torque associated with the inertia of the slowing engine. The combustion torque may be reduced to limit the increase of the total input torque. Once the inertia phase is complete, the input torque may be increased above the original input torque such that the output torque is closer to the original output torque.

A second mechanism for adjusting the transmission speed ratio is a variator. A variator provides a single power flow path with an adjustable ratio that can be set to any level between predetermined lower and upper limits. One type of variator includes a belt that transmits power from one adjustable sheave to another adjustable sheave. Other types of variators include toroidal variators and cone variators. Unlike a slipping clutch, the torque ratio of a variator varies nearly in unison with the speed ratio such that most of the power is transferred as opposed to being converted to heat. (All power transfer mechanisms suffer from some degree of parasitic power loss.) Unlike a torque converter, the amount of torque transferred by a variator is not dictated by the speeds of the elements. The lower and upper limits of the variator ratio do not necessarily correspond to the desired transmission ratio range. Therefore, a continuously variable transmission may include gearing and shift elements that ensure that the transmission delivers the needed transmission ratios. For example, a forward/reverse gearset may be needed.

Figure 3:
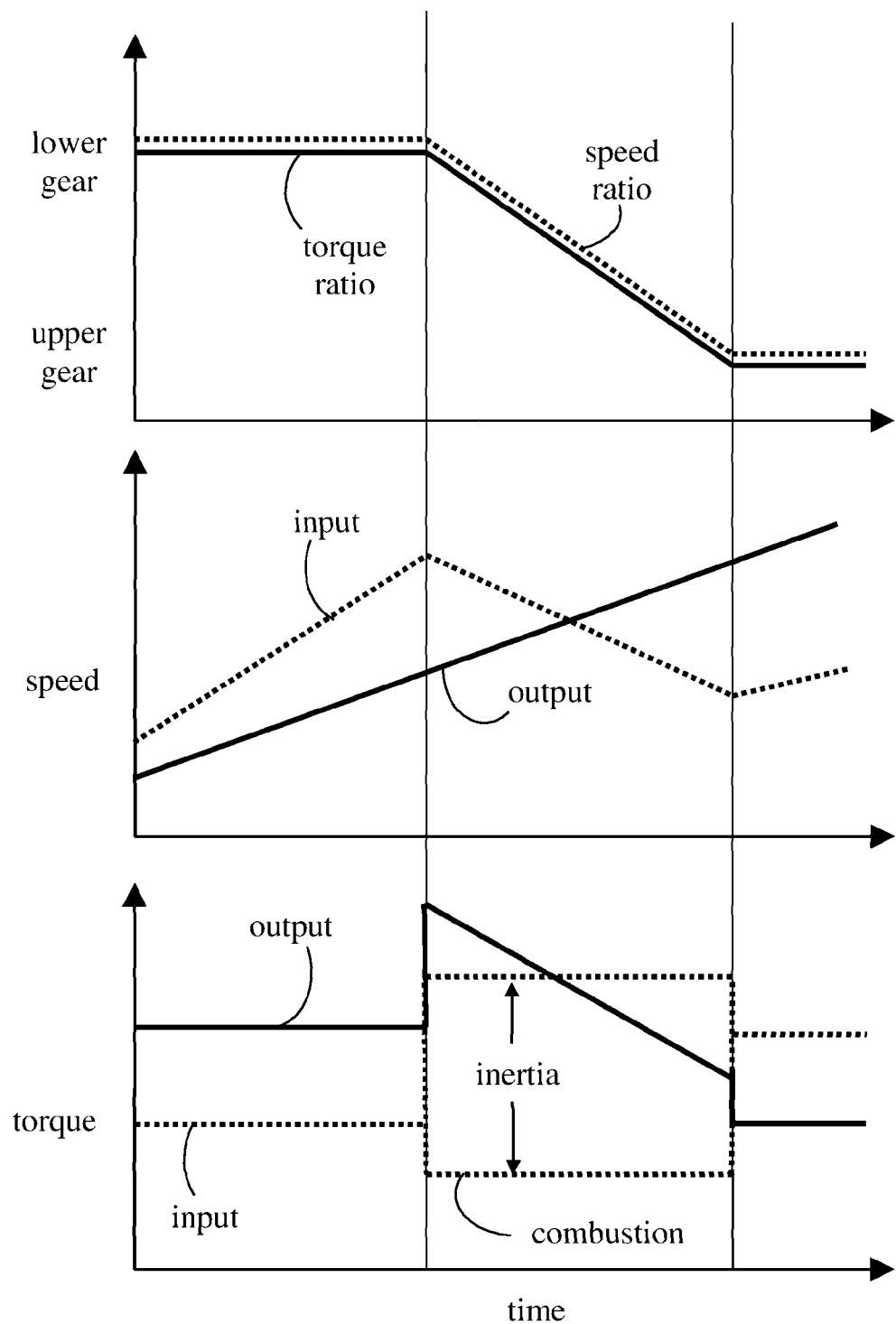
FIG. 3 is set of graphs describing an upshift in a continuously variable transmission.

Many drivers that are familiar with step-ratio transmissions have come to expect upshifts as described above and may be disconcerted by their absence when the drive vehicles equipped with a Continuously Variable Transmission (CVT). Consequently, some vehicles with CVTs are programmed to operate the transmission in a mode in which the ratio is set to a fixed number of pre-determined ratios and to perform discrete shifts among these ratios. FIG. 3 illustrates an upshift with a CVT. Unlike a step-ratio shift, the speed ratio and the torque ratio change simultaneously. During this change the input torque includes combustion torque and inertia torque, similar to the inertia phase of a step-ratio shift. Therefore, the combustion torque may be reduced during this phase to limit the output torque increase. If the input torque is held constant during the shift, as illustrated in FIG. 3, then the output torque will gradually drop. Unlike the step-ratio shift, the output torque does not decrease before the speed ratio begins to change.

Figure 4:
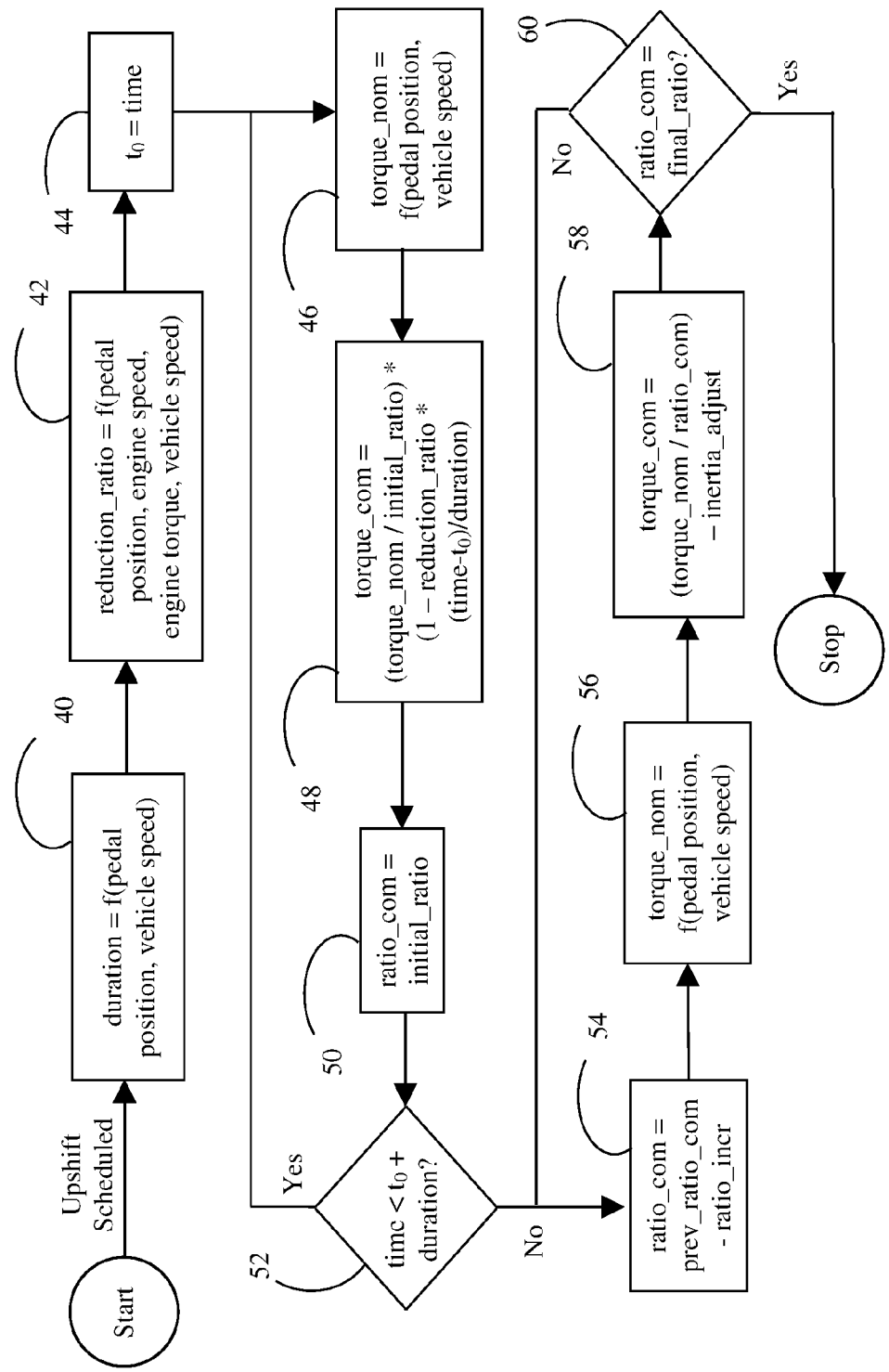
FIG. 4 is a flow chart for a method of controlling a continuously variable transmission to simulate an upshift of a step-ratio transmission.
Figure 5:
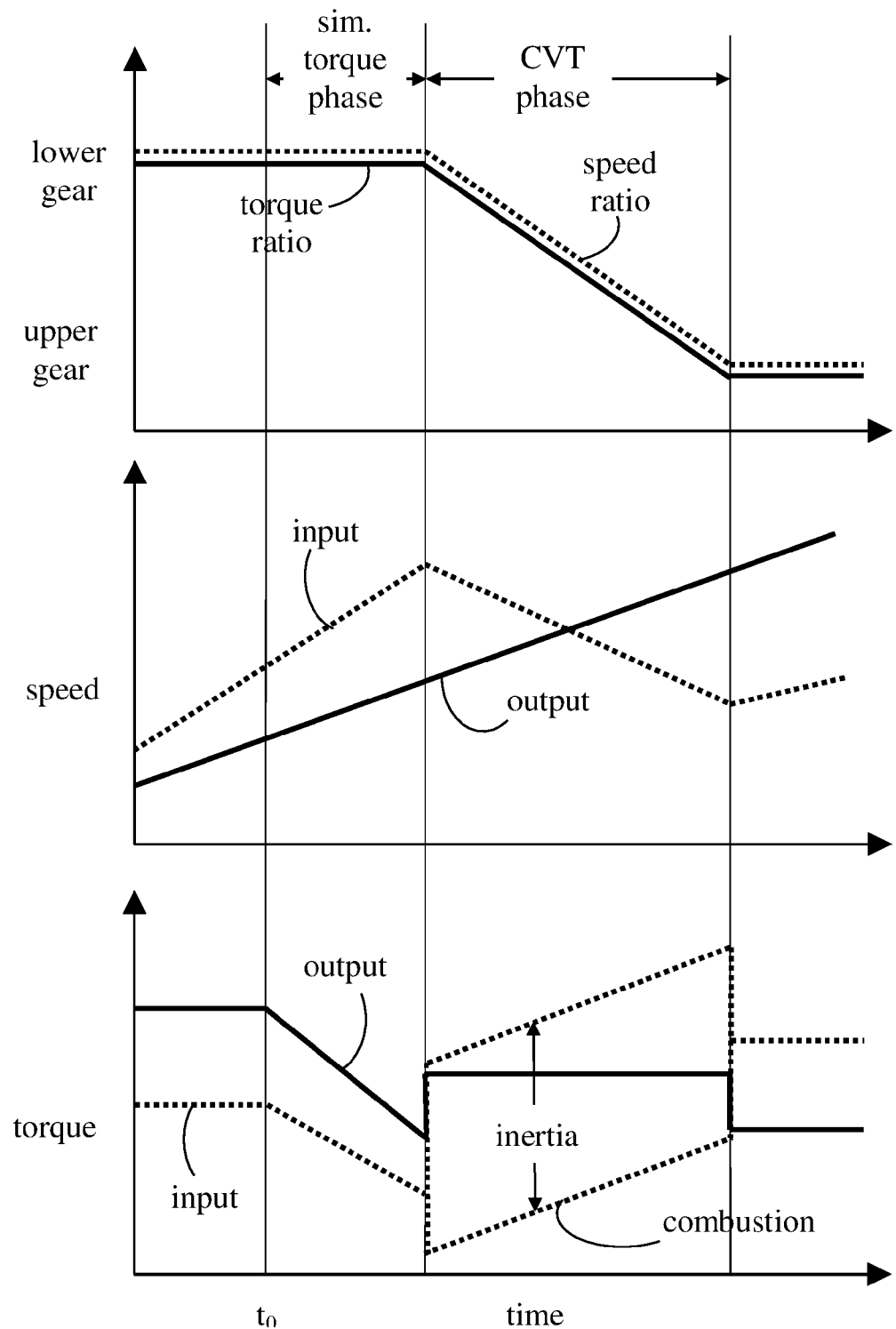
FIG. 5 is set of graphs describing an upshift using the method of FIG. 4.

Although the above operating mode causes the engine speed to follow the pattern that drivers familiar with step-ratio transmissions expect, the output torque does not match expectations during the transition. Specifically, the driver may expect a momentary torque decrease during the torque phase of the shift and steady torque during the inertia phase of the shift. FIGS. 4 and 5 illustrate a revised method of shifting a continuously variable transmission to satisfy these requirements.

Referring to FIG. 4, several steps are taken in response to an upshift request in preparation for remaining steps. At 40, a duration of a simulated torque phase is calculated as a function of accelerator pedal position and vehicle speed. Other measured speeds that are proportional to vehicle speed may be utilized, such as transmission output shaft speed. At 42, a reduction ratio is calculated as a function of accelerator pedal position, engine speed, engine torque, and vehicle speed. At 44, the start time if the simulated torque phase is recorded in the variable $t_0$.

Steps 46-52 simulate a torque phase. At 46, the nominal output torque is computed as a function of accelerator pedal position and vehicle speed. This is the same function that is used prior to initiating the shift. At 48, the commanded engine torque is computed as a function of time and the nominal output torque. The function decreases the commanded engine torque gradually such that, after the duration, the torque has decreased by the reduction ratio. At 50, the variator ratio command is held at the initial ratio. At 52, if the amount of time since the beginning of the torque phase is less than the duration, control reverts to 46. If the time since the beginning of the torque phase is greater than duration, control shifts to 54.

Steps 54-60 control the CVT ratio change to simulate a step-ratio inertia phase. At 54, the variator ratio is gradually decreased. At 56, the nominal output torque is computed as a function of accelerator pedal position and vehicle speed. At 58, the commanded engine torque is computed to counteract the changing torque ratio and to at least partially counteract the impact of the inertia. At 60, if the ratio has reached the destination ratio, the shift control routine exits and normal operation resumes. Otherwise, control reverts to 54 to continue simulating a step-ratio inertia phase.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A method of upshifting a continuously variable transmission comprising:
   scheduling an upshift event necessitating an adjustment of a variator ratio;
   after scheduling the upshift and prior to adjusting the variator ratio, decreasing an input torque to simulate a step-shift torque phase; and
   while decreasing the variator ratio, increasing the input torque to compensate for decreasing torque multiplication to simulate a step-shift inertia phase.

2. The method of claim 1 further comprising increasing the input torque relative to a pre-shift input torque level to reduce a difference in output torque resulting from the decreased variator ratio.

3. The method of claim 1 wherein the upshift is scheduled in response to an increase in a vehicle speed.

4. The method of claim 1 wherein the upshift is scheduled in response to a decrease in an accelerator pedal position.

5. The method of claim 1 wherein the upshift is scheduled in response to driver manipulation of an upshift control.

6. A vehicle comprising:
   an engine;
   a wheel;
   a continuously variable transmission configured to transmit power from the engine to the wheel; and
   a controller programmed to
      in response to scheduling an upshift, reduce a torque output of the engine to simulate a step-shift torque phase, and
      after reducing the engine torque output, reduce a transmission speed ratio and a transmission torque ratio.

7. The vehicle of claim 6 wherein the controller is further programmed to gradually increase the torque output of the engine while gradually reducing the transmission speed ratio and the transmission torque ratio.

8. The vehicle of claim 6 wherein the controller is further programmed to increase the torque output of the engine relative to a pre-shift torque level to reduce a difference in output torque resulting from the decreased transmission torque ratio.

9. The vehicle of claim 6 wherein the controller is further programmed to schedule the upshift in response to an increase in a vehicle speed.

10. The vehicle of claim 6 wherein the controller is further programmed to schedule the upshift in response to a decrease in an accelerator pedal position.

11. The vehicle of claim 6 wherein the controller is further programmed to schedule the upshift in response to driver manipulation of an upshift control.

12. A transmission comprising:
    a variator having a variator ratio; and
    a controller programmed to
       in response to scheduling an upshift event, request an input torque reduction to simulate a step-shift torque phase and
       after the input torque has been reduced, decrease the variator ratio.

13. The transmission of claim 12 wherein the controller is further programmed to request a gradually increasing engine torque while decreasing the variator ratio.

14. The transmission of claim 13 wherein the controller is further programmed to request a reduced engine torque after decreasing the variator ratio to reduce a difference in output torque resulting from the decreased variator ratio.

15. The transmission of claim 12 wherein the controller is further programmed to schedule the upshift in response to an increase in a vehicle speed.

16. The transmission of claim 12 wherein the controller is further programmed to schedule the upshift in response to a decrease in an accelerator pedal position.

17. The transmission of claim 12 wherein the controller is further programmed to schedule the upshift in response to driver manipulation of an upshift control.

* * * * *